United States Patent
Catalano et al.

(10) Patent No.: US 8,781,499 B2
(45) Date of Patent: Jul. 15, 2014

(54) METHODS AND SYSTEMS FOR REMOTE FLOOD ZONE DETERMINATIONS

(75) Inventors: Brian P. Catalano, Plano, TX (US); Leonardo Paneque, Plano, TX (US)

(73) Assignee: Floodsearch LLC, Plano, TX (US)

( * ) Notice: Subject to any disclaimer, the term of this patent is extended or adjusted under 35 U.S.C. 154(b) by 0 days.

(21) Appl. No.: 13/536,535

(22) Filed: Jun. 28, 2012

(65) Prior Publication Data

US 2014/0004883 A1    Jan. 2, 2014

(51) Int. Cl.
| | |
|---|---|
| H04W 24/00 | (2009.01) |
| G01V 3/00 | (2006.01) |
| G01V 3/38 | (2006.01) |
| G06F 7/00 | (2006.01) |
| G01W 1/00 | (2006.01) |
| G09G 5/00 | (2006.01) |

(52) U.S. Cl.
USPC ............... 455/456.3; 702/5; 702/2; 707/769; 340/601; 345/634

(58) Field of Classification Search
CPC ....... G06Q 40/02; G06Q 40/08; G06Q 30/02; G06Q 50/16; G06Q 30/06; G06Q 20/108; G06Q 20/382; G06Q 90/00; G06Q 10/00; G06K 9/00476; G06F 17/18; G06F 17/30241; H04W 4/02
USPC ...................................................... 455/456.3
See application file for complete search history.

(56) References Cited

U.S. PATENT DOCUMENTS

| | | | |
|---|---|---|---|
| 6,631,326 B1 | 10/2003 | Howard et al. | |
| 6,636,803 B1 | 10/2003 | Hartz et al. | |
| 6,842,698 B2 | 1/2005 | Howard et al. | |
| 7,174,301 B2 | 2/2007 | Florance et al. | |
| 7,636,901 B2 | 12/2009 | Munson et al. | |
| 2001/0032050 A1* | 10/2001 | Howard et al. .................. 702/2 |
| 2002/0145617 A1* | 10/2002 | Kennard et al. ............... 345/634 |
| 2003/0064705 A1 | 4/2003 | Desiderio | |
| 2004/0128170 A1* | 7/2004 | MacKethan et al. .............. 705/4 |
| 2007/0038467 A1 | 2/2007 | Honeyager et al. | |
| 2008/0055096 A1* | 3/2008 | Aylward ....................... 340/601 |
| 2008/0221936 A1* | 9/2008 | Patterson .......................... 705/4 |
| 2009/0012803 A1 | 1/2009 | Bishop et al. | |
| 2010/0324942 A1* | 12/2010 | Rogers et al. ..................... 705/4 |
| 2011/0022540 A1 | 1/2011 | Stern et al. | |
| 2011/0258127 A1 | 10/2011 | Graboske et al. | |
| 2013/0197807 A1* | 8/2013 | DU et al. .......................... 702/5 |

* cited by examiner

*Primary Examiner* — Timothy Pham
(74) *Attorney, Agent, or Firm* — ATFirm PLLC; Ralph P. Albrecht (57) ABSTRACT

This patent discloses methods and systems for remotely requesting a flood zone determination from a mobile device such as a smart phone. The methods and systems use the GPS receiver in the mobile device to determine the exact latitude and longitude of the user's location, thus eliminating the need for geocoding, eliminating errors introduced by manual data entry, and eliminating the need for the time consuming manual determination processes required, for example, for non-standard-addressed locations and for structures located near a 100-year flood zone.

14 Claims, 4 Drawing Sheets

METHODS AND SYSTEMS FOR REMOTE FLOOD ZONE DETERMINATIONS

BACKGROUND OF THE INVENTION

Organizations such as the Federal Emergency Management Agency (FEMA) have prepared extensive nationwide flood maps that categorize regions into flood insurance rate zones. For example, a "Zone A" region indicates that the region is more susceptible to flooding than a "Zone X" region. During the course of virtually every real estate transaction, one or more of the parties to the transaction needs to determine whether or not a given structure or piece of real property lies within an area that is susceptible to flooding. For example, a lender may use that information to condition a loan on the purchase of flood insurance, an insurance agent may use that information to quote and/or sell flood insurance, a residential home developer may use that information in planning the layout of home sites, a potential buyer may use that information in calculating an offer price, and a professional such as an appraiser or surveyor might use that information in preparation of an appraisal or survey.

A party interested in flood information typically relies on a service provider to perform a flood zone determination. Using the street address of the property, the service provider locates the address on special maps to determine the flood insurance rate zone for that address. However, manual determination of a flood zone is a time-consuming process, and service providers have developed complex computer software in an attempt to automate flood zone determinations.

Automated flood zone determination involves two steps. In the first step, a user enters a street address into special geocoding software which determines the longitude and latitude coordinates associated with the given street address. Methods of geocoding are known in the art. In the second step, special flood zone determination software uses the longitude and latitude coordinates to find the location in a database of digitized flood zone maps. Methods of flood zone determinations are known in the art. For example, American Flood Research Inc. uses third party geocoding software to convert a street address into a corresponding longitude and latitude, and then uses proprietary flood zone determination software to correlate the latitude/longitude to one of the FEMA flood insurance rate zones.

However, there are several known deficiencies in the current automated flood zone determination systems. First, not every location has a precise street address. In some rural locations, houses may be identified only by a mailing address, for example, "Route 4 Box 17." Or, in an area under development, there simply may be no street name available. Second, even where there is a known street address, the system is still subject to human error. A user entering the address may transpose digits, enter the wrong street name/type, or enter the wrong city or state. For example, "100 Main Street, Ada, Okla." and "100 Main Street, Ada, Ohio" are both actual addresses, but are separated by nearly a thousand miles. Third, a large plot of land, having a single street address, may encompass multiple flood zones that may or may not affect the actual structure. For example, there may be a creek bed several hundred feet away and thirty feet lower in elevation from the proposed home site. The system will be unable to respond to the request automatically, and, without manual intervention, the service provider will run the risk of an inaccurate flood determination. Fourth, in practice, while an interested party may make an in-field inspection of the property, in most instances, the party must return to the office to prepare and send the flood determination request to the service provider, or the party, if not using a flood zone determination service provider, will have to identify the appropriate flood insurance rate map and then locate the structure or property on that map. This creates additional paperwork which must be manually filed, it creates additional opportunities for data-entry errors, and it adds to the amount of time required to obtain the flood zone determination. Fifth, the special geocoding software is not foolproof, and on occasion, may not return the precise latitude and longitude coordinates for a given street address; while the geocoding software might allow manual correction of the coordinates using, for example, a satellite map overlay, this is time consuming and still subject to human error.

Therefore, what is needed in an automated flood determination system is a mechanism that not only speeds up the process but provides precise latitude and longitude coordinates for all real properties, thus eliminating the need for geocoding, which is limited to geocodable addresses and has the potential for geocoding errors, and eliminating the need for any manual intervention for locating real property.

SUMMARY OF THE INVENTION

The present invention incorporates a number of known technologies into a novel system for making flood zone determinations. More particularly, embodiments of the present invention use a mobile application client (an "App"), written to operate on a properly-equipped mobile communications device, to record and transmit longitude and latitude coordinates and a photograph to a flood search service, written to operate on a traditional computer server. The flood search service interfaces with a flood zone determination system to retrieve the flood insurance rate zone corresponding to the longitude and latitude coordinates and sends that flood insurance rate zone back to the App. The flood search server platform also maintains a database for managing users, requests, and responses. The flood zone determination system is a computer programmed to locate a given set of coordinates in a specific flood insurance rate zone. This includes the application of special algorithms, flood insurance rate maps, regulations, and other rules associated with flood zone determination, to identify the flood insurance rate zone associated with the coordinates.

By way of example, the present invention could include an App running on a "smart phone." The user, through the App's interface, instructs the App to (a) use the smart phone's GPS receiver to record the latitude and longitude of the current location, (b) use the smart phone's camera to take a picture of the current location, and (c) use the smart phone's data services to send the latitude and longitude coordinates, the picture, and user identification information to a flood search service. The flood search service obtains the flood insurance rate zone from the flood determination server, records the request and results in its local flood search database, and then sends information related to results back to the App. The App then presents the information, which could include the rate zone identifier, map overlays, a formal flood certificate, flood insurance information, and the like, on the smart phone display.

Thus, the present invention addresses the deficiencies in current flood zone determination systems: Since it provides precise latitude and longitude coordinates rather than relying on geocoding software, it eliminates the uncertainty associated with real properties lacking a precise or non-geocodable street address, it eliminates the uncertainty associated with real properties encompassing multiple flood zones or having structures close to a flood zone, it eliminates the potential for human error associated with manual data entry, and it eliminates the need for manual correction or verification. Since it may associate a photographic record with the latitude and longitude used in determining the flood insurance rate zone, the present invention adds an extra level of confidence in the results. Thus, the present invention completes the flood zone determination for all real properties much faster and more accurately than current systems.

DETAILED DESCRIPTION OF THE INVENTION

First Embodiment

Figure 1:
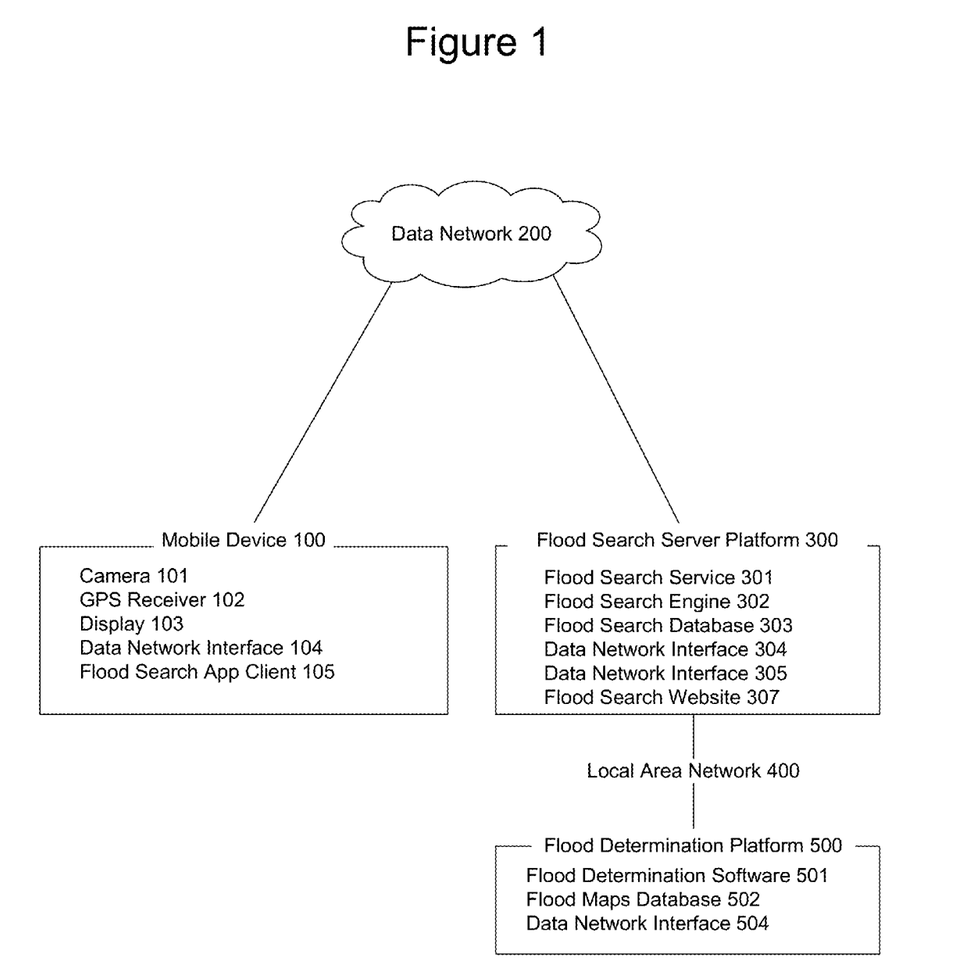
FIG. 1 shows a block diagram for an embodiment of the present invention.

FIG. 1 shows a block diagram for an embodiment of the present invention. In this figure, Mobile Device 100 is an HTC Titan II™ equipped with a 16 MP Camera 101 and a GPS receiver 102, having a Data Network Interface 104 which is capable of connecting to a Data Network 200 using 4G LTE, and running the Windows® Phone operating system along with Flood Search App Client 105 software to implement a portion of the present invention. Data Network 200 is the AT&T 4G LTE data network. Flood Search Server Platform 300 is a Dell PowerEdge 1950 computer running the Windows 2003 Server operating system and a Flood Search Service 301. Flood Search Engine 302 resides on Flood Search Server Platform 300 and implements a portion of the present invention. Flood Search Database 303 resides on Flood Search Server Platform 300 and stores user information and search results. Flood Search Engine 302 has a Data Network Interface 304 connected to Data Network 200 and a Data Network Interface 305 connected to a Local Area Network 400. Flood Determination Platform 500 is a Dell PowerEdge 1950 computer running the Windows 2008 Server operating system along with proprietary Flood Zone Determination Software 501 used by but not within the scope of the present invention. Flood Maps Database 502 resides on Flood Determination Platform 500 and stores information used in the flood determination process as well as the digitized FEMA flood insurance rate maps. Flood Determination Platform 500 has a Data Network Interface 504 connected to Local Area Network 400.

Figure 2:
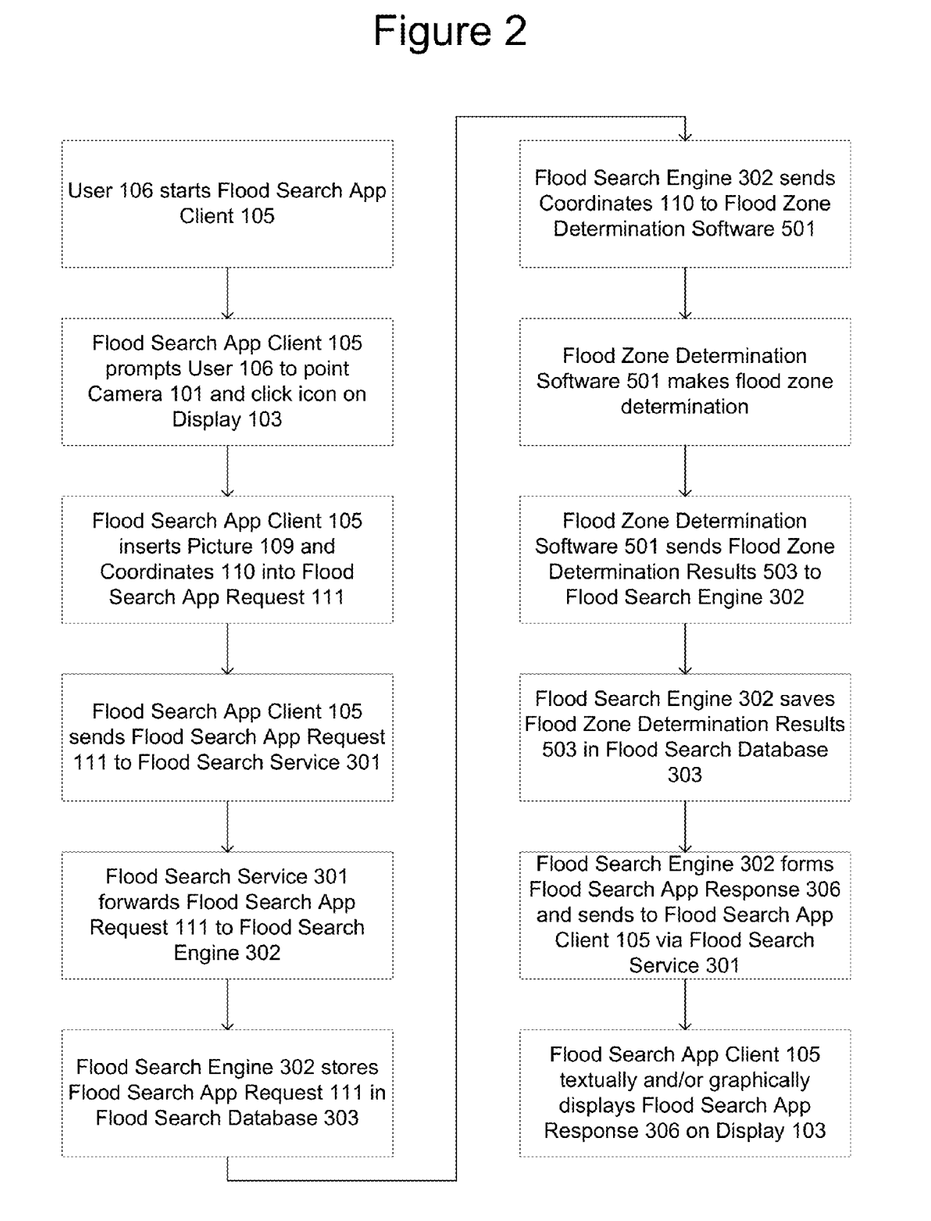
FIG. 2 shows a flow chart of an embodiment of the remote flood zone determination process.

FIG. 2 shows a flow chart of an embodiment of the remote flood zone determination process. First, User 106 starts Flood Search App Client 105 by tapping on the appropriate icon on Display 103. Flood Search App Client 105 then prompts User 106 with a number of options, one of which is the option of making a new flood request. After selecting this option, Flood Search App Client 105 prompts User 106 to point Camera 101 at the point of interest (for example, a structure located on Real Property 108) and provides a "take picture" icon on Display 103 (the icon will only be active once Flood Search App Client 105 confirms that GPS Receiver 102 has stable longitude and latitude coordinates). After pointing Camera 101 at the point of interest, User 106 taps on the icon to take the picture. At roughly the same time as Flood Search App Client 105 takes Picture 109, it retrieves the latitude and longitude Coordinates no from GPS Receiver 102.

Flood Search App Client 105 then provides a "submit" icon on Display 103 to prompt the user to submit the information. When User 106 taps on the appropriate icon, Flood Search App Client 105 sends a Flood Search App Request 111 using HTTP (all data message traffic between Flood Search App Client 105 and Flood Search Service 301 uses HTTP). Flood Search App Request 111 includes Picture 109, Coordinates no, and any additional information necessary or useful to associate Picture 109 and Coordinates 110 with this specific Flood Search App Request in (for example, an identifier associated with User 106, a time/date stamp, and/or an index number), to Flood Search Service 301 which forwards it to Flood Search Engine 302. Flood Search Engine 302 stores Flood Search App Request 111 information in Flood Search Database 303, extracts Coordinates 110 from Flood Search App Request in and forwards Coordinates 110 on to Flood Determination Platform 500 via Local Area Network 400.

Flood Zone Determination Software 501 on Flood Determination Platform 500 uses its proprietary software, Coordinates 110, and the digitized FEMA flood insurance rate maps in Flood Maps Database 502 to make the flood zone determination. Flood Zone Determination Software 501 then sends back Flood Zone Determination Results 503, including the flood zone identifier and the coordinates of the flood zone along with any additional information needed to associate Flood Zone Determination Results 503 with Flood Search App Request 111, to Flood Search Engine 302.

Once Flood Search Engine 302 has received Flood Zone Determination Results 503, it extracts and stores the information into Flood Search Database 303. It then creates a Flood Search App Response 306 message which it sends, via Flood Search Service 301, back to Flood Search App Client 105. The Flood Search App Response 306 includes Coordinates 110, the flood zone identifier associated with Coordinates 110 and the coordinates defining the perimeter of the associated flood zone. Flood Search App Client 105 then uses the information in Flood Search App Response 306 to display the results in text form and/or map form on Display 103. When displaying the results in map form, Flood Search App Client 105 will overlay the flood zone perimeter and location of Real Property 108 on a street map and aerial map provided by other software on Mobile Device 100 (for example, Bing Maps).

Figure 3A:
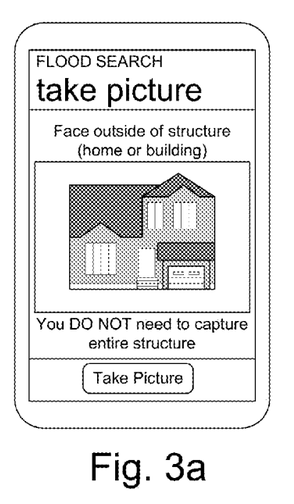
FIGS. 3a-3e show example user interface screen shots during various steps in an embodiment of the present invention.
Figure 3B:
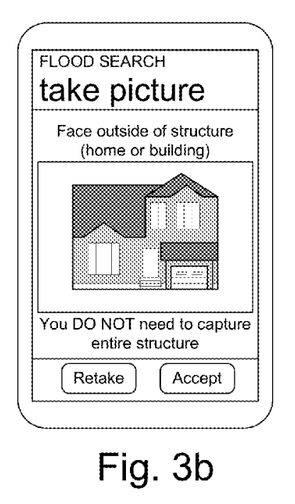
Figure 3C:
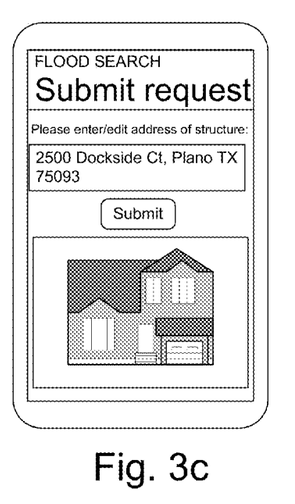
Figure 3D:
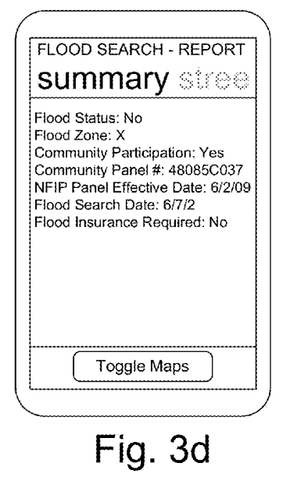
Figure 3E:
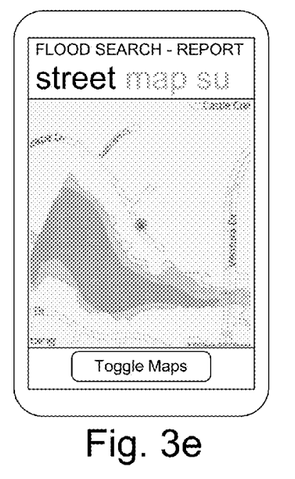

FIGS. 3a-3e show examples of what User 106 might see on Display 103 during the course of using an embodiment of the present invention. FIG. 3a shows Display 103 prior to taking Picture 109 of Real Property 108, FIG. 3b shows Display 103 prior to accepting Picture 109, FIG. 3c shows Display 103 prior to submitting Flood Search App Request 111 to Flood Search Engine 302, FIG. 3d shows the text version of Display 103 after Flood Search App Client 105 has received Flood Search App Response 306, and FIG. 3e shows the map version of Display 103 after Flood Search App Client 105 has received Flood Search App Response 306.

Figure 4:
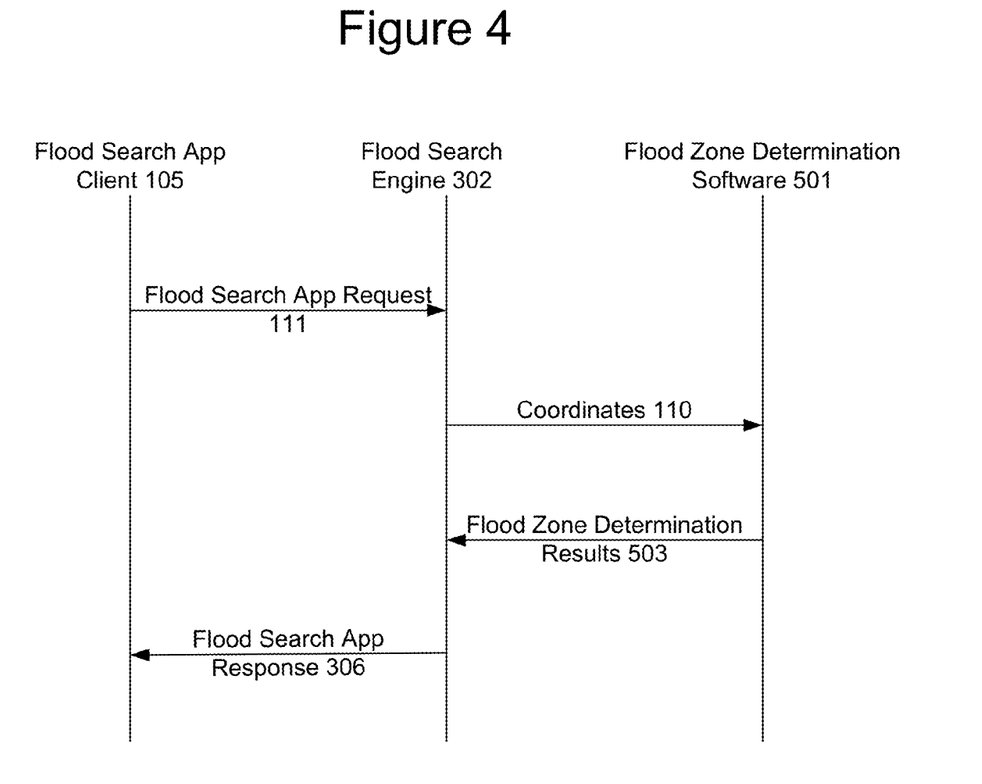
FIG. 4 shows the flow of messages during an embodiment of the remote flood zone determination process.

FIG. 4 shows the flow of messages during an embodiment of the remote flood zone determination process.

Additional Hardware, Software, and Network Embodiments

In the first embodiment, Mobile Device 100 was identified as a HTC Titan II. In other embodiments, Mobile Device 100 can be virtually any device having a central processing unit, memory, a user interface, a digital camera, a GPS receiver, and a wireless network interface. By way of example and not limitation, Mobile Device 100 could be a laptop computer, a net book computer, a tablet computer, a smart phone, a personal digital assistant, or any other comparable device known to a person having ordinary skill in the art. Further, in the first embodiment, Display 103 on Mobile Device 100 was a touch screen interface. In other embodiments, Display 103 can be a non-touch display, and Mobile Device 100 would require another mechanism for allowing User 106 to interface with Mobile Device 100, such as a physical keypad or voice interface. Also in other embodiments, Mobile Device 100 could include an accelerometer, gyroscope, compass, and/or other sensor. In other embodiments, Mobile Device 100 need not include a Camera 101; while Picture 109 provides an additional level of confidence in the results, it is not essential in determining the flood insurance rate zone.

In the first embodiment, Data Network 200 was identified as a 4G LTE data network. In other embodiments, Data Network 200 could be virtually any wireless communications mechanism used to send and receive data to and from a Mobile Device 100. By way of example and not limitation, Data Network 200 could be a mobile broadband network based on GSM/EDGE, UMTS/HSPA, CDMA, and the like, it could be a wireless LAN based on one of the IEEE 802.11 standards, it could be a satellite-based Internet link, or it could be any other comparable network known to a person having ordinary skill in the art.

In the first embodiment, Flood Search Server Platform 300 and Flood Determination Platform 500 were identified as Dell computers running the Window Server operating system. In other embodiments, each of these computers could be could be virtually any computer that has a network interface and a processor with sufficient speed to execute the resident software. By way of example and not limitation, these computers could be one of any number of computers manufactured and sold by Dell, Apple, HP, IBM, Oracle, or any other comparable computer known to a person having ordinary skill in the art. Further, in other embodiments, these computers could be running any operating system available for the hardware platform. By way of example and not limitation, this could be any of the Unix-derived operating systems, Windows, Apple OS X, z/OS, and any other comparable computer known to a person having ordinary skill in the art.

Further, in the first embodiment, Flood Search Server Platform 300 and Flood Determination Platform 500 were identified as physically-separate computers. In other embodiments, the software associated with each could run on the same computer, the software could be distributed over multiple computers, all or part of the software could be running on multiple computers operating as a cluster, or the software could be configured in any other manner known to a person having ordinary skill in the art. Further, if the software is distributed over multiple computers, those computers could be connected via Local Area Network 400 as in the first embodiment, or alternatively, they could be connected over a wide area network or over a combination of local and wide area networks.

Further, in the first embodiment, Flood Search Database 303 and Flood Maps Database 502 were directly accessible by their respective platforms. In other embodiments, either or both databases could be housed on a separate platform and accessed via a network, both databases could reside on the same platform and accessed directly or via a network, both databases could be combined into a single database and/or combined with other databases, or the databases could be arranged in any other functionally comparable configuration known to a person having ordinary skill in the art. Further, the term "database" in the context of this patent does not imply any particular database management system, but instead, simply refers to any organized collection of data, whether it resides in memory, on disk, or both.

Further, in the first embodiment, messages sent by Flood Search App Client 105 were routed to Flood Search Service 301. Flood Search Service 301 may be an off-the-shelf web server configured to coordinate requests and responses with Flood Search Engine 302, it may be a limited-function server that merely understands how to route requests and responses between Flood Search App Client 105 and Flood Search Engine 302, or its functionality may be integrated into Flood Search Engine 302 itself. Further, in the first embodiment, messages between Flood Search App Client 105 and Flood Search Engine 302 used the HTTP protocol. Using HTTP simplifies the design and operation of the system since it is a well-known protocol, there is an abundance of available source code for its implementation and integration in applications, and HTTP message are typically allowed to pass through firewalls. However, in other embodiments, other message transport protocols could be used. By way of example and not limitation, messages could be sent using HTTPS, SMS, MMS, proprietary messaging protocols, or any other comparable messaging technology known to a person having ordinary skill in the art.

Further, in the first embodiment, Flood Search App Client 105 used Bing Maps as the source for the street map when displaying the flood zone overlay. In other embodiments, other map service providers could be used. By way of example and not limitation, this could be Google Maps, Yahoo! Maps, MapQuest, or any other comparable service provider.

Additional Feature Embodiments

The first embodiment described above provides the basic features of the present invention. In other embodiments, Flood Search Engine 302 or Flood Search Service 301 could provide User 106 (or Other User 112) with a web-based interface to Flood Search Database 303. For example, a User 106 or Other User 112 could, via Flood Search App Client 105 or through a traditional web browser client, log into Flood Search Website 307 and review previous Flood Search App Requests in and Flood Search App Responses 306 based on location, date, or other characteristic, or simply review a history of all Flood Search App Requests 111 and Flood Search App Responses 306 associated with User 106 or Other User 112. In addition, User 106 or Other User 112 could print previous requests and results, download them to another computer or separate file, forward them via email, or send them to some other external computer using virtually any electronic transfer mechanism.

Further, in other embodiments, the user interface on the Flood Search App Client 105 could provide the typical features associated with app user interfaces, such as undo and redo, online help, auditory alerts, history, user preferences, account updates, emailing and/or texting results, sorting and searching information, purchasing additional flood search requests, and the like.

Further, in other embodiments, the coordinate received from Flood Search App Client 105 may be in a specific coordinate system (for example, GSW84) and such coordinate systems must be used by Flood Zone Determination Software 501. Flood Zone Determination Software 501, if needed, may perform conversions, recalculations, and rescaling to ensure accurate flood zone determination results by Flood Zone Determination Software 501 and in the display of the maps on Display 103. By way of example and not limitation, in order to display a flood zone overlay on a Bing map on Display 103, the perimeter of the flood zone overlay must be precisely scaled and positioned to match the Bing map. One method to accomplish this would be for the system to send a request to Bing Maps asking for the latitude and longitude of a boundary map around Coordinates 110 at a specific zoom level (for example, 2000 feet). Upon receipt of the response from Bing Maps, Flood Zone Determination Software 501 would use those boundary coordinates to scale the coordinates defining the perimeter of the associated flood zone map overlay. In so doing, when Flood Search App Client 105 overlays the flood zone perimeter on the Bing map on Display 103, User 106 will be able to see precisely where the flood zone begins and ends in reference to the base Bing map.

Further, in other embodiments, when displaying the information from Flood Search App Response 306, Flood Search App Client 105 could allow the User 106 to toggle between the text and map versions of the results, zoom and pan the map version of the results, add and remove various map overlays such as aerial photographs, landmarks, political boundaries, terrain, elevation, nearby flood zones, and other map-related features.

Further, where Real Property 108 may be partly within and/or near a 100-year flood plain, it may be necessary to determine whether any part of a structure on Real Property 108 is within that 100-year flood plain. Therefore, in other embodiments, Flood Search App Client 105 may be configured to accept additional pairs of Coordinates 110 before sending Flood Search App Requests 111, into which the additional pairs of Coordinates 110 have been inserted. Flood Search Engine 302 would receive and forward the Coordinates 110 to Flood Determination Software 501 for the flood zone determination. By way of example and not limitation, Flood Search App Client 105 could instruct User 106 to stand at various locations of Real Property 108 and submit the additional pairs of Coordinates 110. The additional pairs of Coordinates 110 could define a straight line corresponding to the back wall of a house or structure on Real Property 108, a polygon corresponding to the perimeter of a house or structure on Real Property 108, or any other geometric shape. If a 100-year flood zone intersects any part of the geometric shape, the structure on Real Property 108 would be determined to be in a 100-year flood plain and flood insurance would be recommended or required.

Further, in other embodiments, Flood Search App Client 105 could send other readings from sensors integrated into Mobile Device 100, for example, an accelerometer, a gyroscope, a compass, a range finder, or a stereoscopic camera, to Flood Search Engine 302. Flood Search Engine 302 (or Flood Search App Client 105) could use this additional information to calculate the longitude and latitude of the polygon associated with a structure at which the camera was aimed when User 106 took Picture 109. The longitude and latitude of this polygon could be used in making a flood zone determination where the Real Property 108 sits on the boundary of multiple flood insurance rate zones.

Further, in other embodiments, where the results indicate the property is in a 100-year flood zone where insurance is recommended or may be required, Flood Search Engine 302 could send additional insurance-related information to Flood Search App Client 105. Such information could include contact information about insurance options, contact information for insurance agents, insurance quotes, and/or contracts for the purchase of insurance.

Further, in other embodiments, along with the basic flood zone determination and map, Flood Search Engine 302 could send additional related information to Flood Search App Client 105 for display. By way of example and not limitation, additional information may include detailed information about the flood zone, including an indication of whether or not there was community participation on the flood zone, the community panel, the date of the applicable flood zone panel, an indicator of whether or not flood insurance was recommended or required, map overlays for neighboring flood zones, distance to nearest 100-year flood zone, a standard flood hazard determination form (for example, FEMA form 81-93 or some variant), and/or an elevation certificate (for example, FEMA form 81-31).

Further, in other embodiments, Flood Search Database 303 could contain additional information manually entered by User 106 and sent by Flood Search App Client 105 to Flood Search Engine 302; by way of example and not limitation, such information might include notes about what User 106 observed at Real Property 108. Further, Flood Search Database 303 could contain additional information automatically collected by Flood Search App Client 105 and sent to Flood Search Engine 302; by way of example and not limitation, such information might include the Camera 101 angle, direction, and distance from a structure when User 106 took Picture 109. Further, Flood Search Database 303 could contain additional information provided by Flood Zone Determination Software 501; by way of example and not limitation, such information might include version numbers associated with Flood Zone Determination Software 501 or Flood Maps Database 502.

Table 1 below lists examples of information that could be stored on a per-request basis in Flood Search Database 303.

TABLE 1

| Request-related data |
| --- |
| Request Date |
| Request Time |
| Longitude and latitude coordinates |
| Street address |
| Location description |
| Photograph |
| Mobile device identification |
| User identification |
| Flood search app client software version |
| Flood search app server software version |
| Flood zone determination software version |
| Direction of camera |
| Angle of camera |
| Distance from camera to structure |
| Free-form notes |

Further, in other embodiments, Flood Search App Client 105 could require the user to provide some form of identification before allowing User 106 to initiate the remote flood zone determination process. One method to do this would be to require the User 106 to enter a personal identification number (PIN) 107. Flood Search App Client 105 would send this PIN 107 to Flood Search Engine 302 which would determine if PIN 107 is found in Flood Search Database 303. If PIN 107 exists, Flood Search Engine 302 would send a message to Flood Search App Client 105 instructing it to allow User 106 to proceed. If it does not exist, Flood Search Engine 302 would send an error message back to Flood Search App Client 105 which would display appropriate text on Display 103 and allow User 106 to enter a correct PIN 107. In other embodiments, the Flood Search App Client 105 could use any identification mechanism associated with User 106, in lieu of or in addition to PIN 107. By way of example and not limitation, this could be a username/password combination, an email address, the phone number associated with Mobile Device 100, a public key certificate, or any other identifier.

Additionally, the user identifier could be stored on Mobile Device 100 so that once entered, User 106 need not manually enter the identifier on every invocation of Flood Search App Client 105. Further, in other embodiments, instead of having a preconfigured entry for User 106 in Flood Search Database 303, Flood Search App Client 105 could be initially loaded with a unique identifier having a fixed number of flood search App requests enabled. Flood Search App Client 105 would send the unique identifier to Flood Search Engine 302. If the unique identifier was not already in Flood Search Database 303, Flood Search Engine 302 would add the entry; if the unique identifier was already in Flood Search Database 303, Flood Search Engine 302 would which would confirm that the fixed number of requests has not been exceeded. Thereafter, each time User 106 made a request through Flood Search App Client 105, Flood Search Engine 302 would decrement the number of requests remaining.

Table 2 below lists examples of information that could be stored on a per-user basis in Flood Search Database 303.

TABLE 2

| User-related data |
| --- |
| Name |
| Company |
| Address |
| Phone number |
| Email address |
| PIN |
| User name |
| Password |
| Requests completed |
| Requests remaining |

While specific embodiments have been illustrated and described, numerous modifications come to mind without significantly departing from the spirit of the invention, and the scope of protection is only limited by the scope of the accompanying Claims.

The invention claimed is:

1. An automated system for remotely obtaining flood zone information, the automated system comprising:
a mobile device comprising a GPS receiver, a computer processor and memory, a user interface, a first data network interface, and a flood search app client;
a flood search server platform device comprising a computer processor and memory, a second and third data network interface, a flood search database, and a flood search engine; and
a flood determination platform comprising a computer processor and memory, a fourth data network interface, a flood maps database, and flood zone determination software;
where the flood search app client comprises software for receiving data from and presenting data to a user via the user interface, software for retrieving from the GPS receiver a latitude coordinate and a longitude coordinate corresponding to a geographic location associated with the mobile device, software for sending the coordinates to the flood search engine via the first data network interface, software for receiving a flood insurance rate zone corresponding to the coordinates from the flood search engine via the first data network interface, and software for displaying the flood insurance rate zone on the user interface;

where the flood search engine comprises software for receiving the coordinates from the flood search app client via the second data network interface, software for sending the coordinates to the flood zone determination software via the third data network interface, software for receiving the flood insurance rate zone from the flood zone determination software via the third data network interface, software for storing the coordinates and flood insurance rate zone in the flood search database, and software for sending the flood insurance rate zone to the flood search app client via the second data network interface;

where the flood zone determination software comprises software for receiving coordinates from the flood search engine via the fourth data network interface, software for using the flood maps database to identify the flood insurance rate zone corresponding to the coordinates, and software for sending the flood insurance rate zone to the flood search engine via the fourth data network interface; and where the mobile device further comprises a digital camera;

the flood search app client further comprises software for taking and storing a picture via the digital camera and software for sending the picture to the flood search engine via the first data network interface; and the flood search engine further comprises software for receiving the picture from the flood search app client via the second data network interface, and software for storing the picture in the flood search database;

where the flood search app client further comprises software for displaying on the user interface a street map corresponding to an area surrounding the coordinates and a perimeter of a region surrounding the coordinates and having the same flood insurance rate zone as the coordinates; and where the map further comprises a graphic representation of a perimeter of a region near to but not surrounding the coordinates and having a different flood insurance rate zone as the coordinate.

2. The automated system of claim 1 where:
the flood search engine further comprises software for creating a standard flood hazard determination form based on the flood insurance rate zone.

3. The automated system of claim 1 where:
the flood search engine further comprises software for automatically emailing the flood insurance rate zone to a pre-configured email address.

4. The automated system of claim 1 where:
the flood search app client further comprises software for allowing the user to send the flood insurance rate zone to a user-specified email address.

5. The automated system of claim 1 where:
the flood search app client further comprises software for displaying on the user interface information regarding the availability of flood insurance.

6. The automated system of claim 1 where:
the coordinates are a first pair of coordinates;
the flood search app client further comprises software for retrieving from the GPS receiver a plurality of additional pairs of latitude and longitude coordinates, the plurality of additional pairs of coordinates corresponding to a plurality of geographic locations associated with the mobile device, and software for sending the plurality of additional pairs of coordinates to the flood search engine; and the flood search engine further comprises software for receiving the plurality of additional pairs of latitude and longitude coordinates from the flood search app client, software for sending the plurality of additional pairs of latitude and longitude coordinates to the flood zone determination software, and software for storing the plurality of additional pairs of latitude and longitude coordinates in the flood search database.

7. An automated method of remotely obtaining a flood zone determination comprising:

on a mobile device, receiving an interaction from a user, responding to the user interaction by determining the location coordinates of the mobile device, forming a flood search app request by inserting the location coordinates into the flood search app request, and sending the flood search app request to a flood search server platform;

on the flood search server platform, receiving the flood search app request, responding to the flood search app request by extracting the location coordinates from the flood search app request, sending the location coordinates to a flood determination platform, receiving a flood insurance rate zone from the flood determination platform, storing the location coordinates and flood insurance rate zone in a flood search database, forming a flood search app response by inserting the flood insurance rate zone into the flood search app response, and sending the flood search app response to the mobile device; and where the mobile device comprises a computer processor and memory, an integrated GPS receiver for determining the location coordinates of the mobile device, a user interface for receiving user input and displaying information, and a first data network interface for sending and receiving data communications;

the flood search server platform comprises a computer processor and memory, a second and third data network interface, and the flood search database;

the flood determination platform comprises a computer processor and memory, a fourth data network interface, and a flood maps database, and flood zone determination software; and where the mobile device further comprises an integrated digital camera for taking pictures;

on the mobile device, the step of responding to the user interaction further comprises taking a picture and the step of forming a flood search app request further comprises inserting the picture into the flood search app request; and on the flood search server platform, the step of responding to the flood search app request further comprises extracting the picture from the flood search app request, and the step of storing the location coordinates and flood insurance rate zone in the flood search database further comprises storing the picture in the flood search database;

where the step of forming the flood search app response further comprises inserting the coordinates of a first perimeter of a region surrounding the location coordinates and having the same flood insurance rate zone as the location coordinates;

the step of extracting the flood insurance rate zone from the flood search app response further comprises extracting the coordinates of the first perimeter;

the step of displaying the flood insurance rate zone on the mobile device further comprises displaying a street map corresponding to an area surrounding the location coordinates and a map overlay displaying the first perimeter; and where the step of forming the flood search app response further comprises inserting the coordinates of a second perimeter near to but not surrounding the location coordinates and having a flood insurance rate zone different from the flood insurance rate zone of the location coordinates;

the step of extracting the flood insurance rate zone from the flood search app response further comprises extracting the coordinates of the second perimeter; and the step of displaying the flood insurance rate zone on the mobile device further comprises displaying the second perimeter.

8. The automated method of claim 7 where:
the step of receiving a flood insurance rate zone from the flood determination platform is followed by creating a standard flood hazard determination form using the flood insurance rate zone.

9. The automated method of claim 7 where:
the step of receiving a flood insurance rate zone from the flood determination platform is followed by emailing the flood insurance rate zone to a pre-configured email address.

10. The automated method of claim 7 where:
the step of receiving a flood insurance rate zone from the flood determination platform is followed by texting the flood insurance rate zone to a pre-configured telephone number.

11. The automated method of claim 7 where:
the step of receiving a flood insurance rate zone from the flood determination platform is followed by emailing the flood insurance rate zone to a user-specified email address.

12. The automated method of claim 7 where:
the step of receiving a flood insurance rate zone from the flood determination platform is followed by texting the flood insurance rate zone to a user-specified telephone number.

13. The automated method of claim 7 where:
the step of forming flood search app response further comprises inserting information about the availability of flood insurance into the flood search app response; and
the step of displaying the flood insurance rate zone on the mobile device further comprises displaying information about the availability of flood insurance.

14. The automated method of claim 7 where:
on the mobile device, the method further comprises receiving a plurality of interactions from the user, responding to the plurality of interactions by determining a plurality of location coordinates of the mobile device, and where the step of forming a flood search app request further comprises inserting the plurality of location coordinates into the flood search app request; and
on the flood search server platform, the step of responding to the flood search app request further comprises extracting the plurality of location coordinates from the flood search app request, the step of sending the location coordinates to the flood determination platform comprises sending the plurality of location coordinates to the flood determination platform, and the step of storing the location coordinates in the flood search database further comprises storing the plurality of location coordinates in the flood search database.

* * * * *